Feb. 3, 1959  P. ROBINSON  2,872,629
FUSED SALT ELECTROLYTE
Filed May 28, 1953
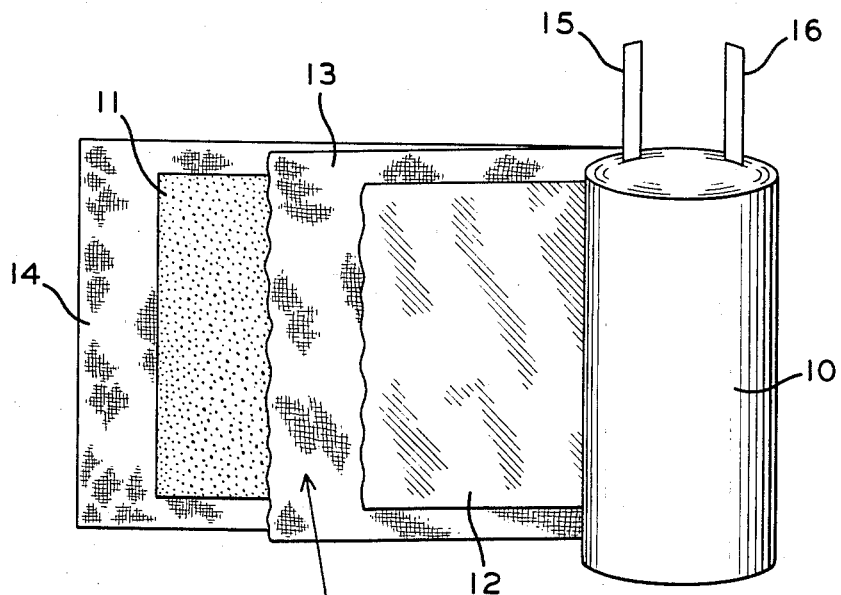
ELECTROLYTE
EUTECTIC OF ALKYL
AMINE SALTS
INVENTOR.
PRESTON ROBINSON
BY
Connolly and Hutz
HIS ATTORNEYS United States Patent Office 2,872,629
Patented Feb. 3, 1959

2,872,629
FUSED SALT ELECTROLYTE

Preston Robinson, Williamstown, Mass., assignor to Sprague Electric Company, North Adams, Mass., a corporation of Massachusetts Application May 28, 1953, Serial No. 358,183

2 Claims. (Cl. 317—230)

The present invention relates to new and improved electrolytes more specifically to electrical components such as capacitors which utilize these electrolytes.

It is an object of the present invention to produce electrolytes of the indicated category which are advantageous for use throughout a wide range of temperatures and which are easily and cheaply handled and which exhibit substantially constant properties throughout a range of temperatures as indicated. These and further objects of the invention, as well as the advantages of it will be apparent from the following description and claims. The single figure of the appended drawing represents a partially unrolled capacitor utilizing the electrolyte of this invention.

In effect, the present inventive concept is based upon the discovery that substantially eutectic mixtures of at least two lower alkyl salts of acids selected from the group consisting of picric, picrolonic, flavianic, reinecke, and picryl sulfonic, which are liquid at 20° C. or below form satisfactory electrolytes. Such compositions can be used at a range of temperatures from their eutectic point to a maximum of about 250° C. without difficulty. They are not corrosive within this range of temperatures and further, do not volatilize so as to require venting. Because of their high conductivity, the new electrolytes of the invention are quite advantageous in many specialized applications.

For a great many years efforts have been set forth in the literature to produce electrolytes for various applications. None of these attempts has been completely successful, although theoretically many of them should have approached more closely the desired results than they did. One difficulty with practically all of the prior electrolyte systems was that they contained solutes dissolved in a solvent. The solvents in practically all cases are either water or various polyhydric alcohols, such as for example ethylene glycol, propylene glycol, etc. These classes of solvents tend to volatilize quite easily or decrease quite rapidly in "mobility" toward low temperatures, say around 20° C. to 0° C. This volatilization requires venting of units employing these electrolytes, and when it occurs, a change in the concentration of the remaining mixture takes place. This, in turn, deleteriously affects the characteristics of the electrolyte and the unit containing same. In a similar manner, lower temperatures with such electrolytes cause a marked drop in properties, such as conductance, etc.

According to one phase of the present invention, these disadvantages are avoided by the use of materials that do not require solvents. The eutectic mixtures of the present invention do not change materially in conducting characteristics throughout decreased temperatures approaching the eutectic point of the mixture. Previously, it has been proposed to form various simple organic salts, such as ammonium acetate, oxalate, citrate, formate, and lactate into so-called fused salt electrolytes. An example of this is shown in the Clark Patent No. 2,022,500. The electrolytes of this type are suitable for use only within a comparatively small range of temperatures primarily because of the tendency of the organic compounds used therein to decompose at elevated temperatures under conditions of high electrical stress. The present inventive concept is distinguished over such art by the discovery that lower alkyl salts of acids selected from the group consisting of picric, picrolonic, flavianic, reinecke and picryl sulfonic which are liquid at 20° C. or below can be used throughout a wider range of temperatures than the prior art electrolytes of the type exemplified by the Clark patent with satisfactory or improved characteristics throughout this wider range of temperatures. This discovery marks a substantial improvement inasmuch as those skilled in the art could not have predetermined that the relatively complex organic molecules employed herein could be satisfactory for this purpose.

The term "lower alkyl salts" as used herein applies to salts in which the alkyl group contains from 1 to 5 carbon atoms. A number of salts falling within the indicated groupings are given below:

*Preferred salts for use of the invention*

| Picrates: | Melting points (°C) |
|---|---|
| Diacetylammonium picrate | 55 |
| Tributylammonium picrate | 105 |
| N,N-diethyl (4-amino-5-methyl) hexylamine picrate | 75–6 |
| N-(2-diethyl amino ethyl)-4-methoxy diphenyl ammonium picrate | 139 |
| 2-imino-1-benzyl piperidine picrate | 106 |
| (methyl propyl amino) acetonitrile picrate | 82–3 |
| Beta-(methyl propyl amino)propionitrile picrate | 82–3 |
| Diethyl isoamyl ammonium picrate | 75 |
| Epsilon-chlor-alpha-amino beta-methyl pentane picrate | 65–6 |
| N-heptyl-N(beta hydroxyethyl) ammonium picrate | 70–1 |
| Di-n-butyl ammonium picrate | 59 |
| Diconiine picrate | 75 |
| N,N-dipropyl-2,2-diethoxy ethyl amine picrate | 47 |
| 2-methyl pentylamine picrate | 77–8 |
| (1-dimethylamino) octane picrate | 62–5 |
| N,N-dimethyl cetylammonium picrate | 69 |
| Ethyl tripropyl ammonium picrate | 107.2 |
| Tetraisopropyl ammonium picrate | 119.6 |
| Tetraisoamyl ammonium picrate | 87 |
| N-methyl benzylammonium picrate | 118 |
| N-methyl-o-toluidine picrate | 90 |
| N,N-di(hydroxy ethyl)ammonium picrate | 110 |
| N-ethyl-N-benzyl aniline picrate | 111 |
| n-Heptyl ammonium picrate | 124.2 |
| Dimethyl ammonium picrate | 160 |
| Methyl ethyl ammonium picrate | 96.8 |
| Di-n-propyl ammonium picrate | 98.6 |

| Picrates: | Melting points (°C) |
|---|---|
| Diethyl ammonium picrate | 70.2 |
| Di-isoamyl ammonium picrate | 94.5 |
| Dimethyl dipropyl ammonium picrate | 93 |
| Diethyl dipropyl ammonium picrate | 79.8 |
| Methyl tripropyl ammonium picrate | 82.2 |
| Ethyl trimethyl ammonium picrate | 307–8 |
| Tetra-n-propyl ammonium picrate | 115–116.5 |
| Tetra-n-butyl ammonium picrate | 89.5 |
| Tetra-n-amyl ammonium picrate | 74 |
| Phenyl trimethyl ammonium picrate | 122.5–123 |
| Methyl-tri-n-butyl ammonium picrate | 28 |
| Propyl-tri-n-butyl ammonium picrate | 89 |
| Beta-dimethylamino ethyl alcohol picrate | 96 |
| Trimethyl ammonium picrate | 216 |
| Laevo-Histidine picrate | 86 |
| Allylammonium picrate | 140 |
| 2 methyl piperidine picrate | 135 |
| 3 methyl piperidine picrate | 138 |
| Tetra-n-butyl phosphonium picrate | 55 |
| Tetra-n-butyl arsonium picrate | 86 |
| Tri-n-butyl sulfonium picrate | 70 |
| Flavianates: | |
| Beta(N-ethyl-N-2-pentyl amino)propionitrile flavianate | 152–4 |
| Beta(N-ethyl-N-2-heptyl amino)propionitrile flavianate | 125–6 |
| Beta-(1-pyrrolidyl amino) propionitrile flavianate | 140–5 |
| Gamma (ethyl methyl amino) butyro nitrile flavianate | 139–140 |
| Beta-(sec.-butyl isopropyl amino) propionitrile flavianate | 120–125 |
| Reineckates: | |
| Carnitine reineckate | 147 |
| Acetyl carnitine reineckate | 154 |
| Methyl carnitine reineckate | 136 |
| Ethyl carnitine reineckate | 135 |
| Betaine carnitine reineckate | 154 |
| Picryl sulfonates: | |
| N,N-diethyl-piperidine dipicryl sulfonate | 173–4 |
| N,N-dibutyl piperidine dipicryl sulfonate | 167–170 |
| N,N-diamyl piperidine dipicryl sulfonate | 166–7 |
| Picrolonates: | |
| Dipropyl-(beta-hydroxyethyl) ammonium picrolonate | 128–130 |
| Di-isobutyl-(beta-hydroxyethyl) ammonium picrolonate | 134–5 |
| Di-isoamyl (beta-hydroxyethyl) ammonium picrolonate | 88 |
| Propyl-bis-(beta-hydroxyethyl) ammonium picrolonate | 126–8 |
| Isobutyl (beta-hydroxyethyl) ammonium picrolonate | 113–4 |
| Isoamyl (beta-hydroxyethyl) ammonium picrolonate | 120–3 |
| Diethyl-(beta, gamma-dihydroxypropyl) ammonium picronolates | 116–8 |
| N-(epsilon-Chlor-n-amyl)-pyrrolidin picrolonate | 128 |
| 2,5-dimethyl pyrrolin picrolonate | 130 |
| 1-phenyl-3,4,5-trimethyl pyrazol picrolonate | 120 |
| Sphingosine picrolonate | 87–9 |
| N-methyl alpha pyridon picrolonate | 120 |
| N-(2-diethylaminoethyl)-N,N-(4-methoxy diphenyl) ammonium picrolonate | 120–1 |

The eutectic mixtures of salts, such as are indicated above can be intermixed with a high proportion of a conventional organic plasticizer in order to obtain improved conductivities. The percentage of such secondary ingredients can vary from about ½ to 90%. Suitable examples of these plasticizers are given as follows:

*Preferred Plasticizers*

| | Boiling Point, °C. at 760 mm. of mercury unless otherwise specified |
|---|---|
| Phthalate Esters: | |
| Dimethyl phthalate | 282 |
| Diethyl phthalate | 295 |
| Dibutyl phthalate | 340 |
| Di(methoxyethyl) phthalate | 200–4 mm. |
| Di(ethoxyethyl) phthalate | 205–5 mm. |
| Di(butoxyethyl) phthalate | 222–4 mm. |
| Methyl phthalyl ethyl glycollate | 189–5 mm. |
| Diethyl ester of phthalyl glycollic acid | 190–5 mm. |
| Dibutyl ester of phthalyl glycollic acid | 219–5 mm. |
| Ester Plasticizers: | |
| Triacetin | 260 |
| Butyl acetyl ricinoleate | 230–4 mm. |
| Dibutyl sebacate | 345–5 mm. |
| Methyl abietate | 360 |
| Dihydromethyl abietate | 365 |
| Triethylene glycol dihexoate | 199–5 mm. |
| Triethylene glycol dioctoate | 215–5 mm. |
| Phosphate Esters: | |
| Tributyl phosphate | 140–5 mm. |
| Tricresyl phosphate | 295–13 mm. |
| Di-(p-tert-butylphenyl) monophenyl phosphate | 260–5 mm. |
| Diphenyl mono-(o-xenyl) phosphate | 250–5 mm. |
| Di-(o-xenyl) monophenyl phosphate | 285–5 mm. |
| Sulfonamide Plasticizers: | |
| N-ethyl,p-toluene sulfonamide | |
| N-ethyl,o-toluene sulfonamide | |

A suitable unplasticized electrolyte for use with the invention consists of 50% diacetyl ammonium picrate and 50% dimethyl cetyl ammonium picrate. Another consists of equal parts by weight of tetra-n-amyl ammonium picrate and methyl-n-butyl ammonium picrate. A third consists of approximately equal parts of di-isoamyl-(beta-hydroxyethyl) ammonium picrolonate and sphingosine picrolonate. A fourth consists of one part beta (N-ethyl-N-2-heptyl amino) propionitrile flavianate and 1 part beta-(sec.-butyl isopropyl amino) propionitrile flavianate. A fifth consists of 1 part ethyl carnitine reineckate, 1 part methyl carnitine reineckate, and 2 parts tetra-n-butyl phosphonium picrate.

A suitable plasticized electrolyte within the scope of the present invention consists of 5% phenyl trimethyl ammonium picrate, 5% ethyl trimethyl ammonium picrate and 90% of methyl abietate.

The above electrolyte mixtures make very satisfactory electrolytic capacitors when impregnated into convolutely wound pair of aluminum foils spaced by a 5 mil thick woven Fiberglas spacer. Suitable foils are 3 mils thick and ¾ inches wide, with a total area of 5 sq. inches. One of the foils can be untreated, the other being anodically oxidized in a 2% aqueous solution of boric acid to a potential of 600 volts. Such an impregnated assembly can be placed inside a container such as molded resin, or a metal cylinder, with leads suitably projecting through one or both ends of the cylinder.

A suitable electrolytic capacitor is depicted in the drawing. Partially unwound capacitance section 10 comprises anode 11 of a so-called "valve" metal (e. g. aluminum, tantalum, zirconium, titanium) having on its surface an oxide coating that functions as the active dielectric for the capacitor. Cathode 12 is of a valve metal or a relatively inert metal such as silver depending on the capacitor application and its requirements. Anode 11 and cathode 12 are separated by porous spacers 13 and 14 of an inert material such as Fiberglas, mica-paper, and the like. The spacers 13 and 14 are impregnated with the fused salt electrolyte of the invention. Electrodes 11 and 12 are provided with tabs 15 and 16, respectively, to serve as terminals for the capacitor; tabs 15 and 16 may extend from the same or opposite ends of the section.

Although eutectic mixtures as described above are very effective, other mixtures can be used in such capacitors so long as they have a melting point low enough. In fact, any amine or substituted amine salts of the above-mentioned acids will be effective.

As many apparently widely different embodiments of this invention may be made without departing from the spirit and scope hereof, it is to be understood that the invention is not limited to the specific embodiments hereof, except as defined in the appended claims.

What is claimed is:

1. A new and improved electrolyte consisting essentially of a plasticized substantially eutectic mixture of equal parts of phenyl trimethyl ammonium picrate and ethyl trimethyl ammonium picrate in about 90% of methyl abietate.

2. An electrolytic capacitor comprising convolutely wound filmable metal foils separated by an inert spacer impregnated with a eutectic mixture of at least two lower alkyl amine salts of acids selected from the group consisting of picric, picrolonic, flavianic, reinecke and picric sulfonic which are liquid at 20° C., said foils being alternately untreated and oxidized.

References Cited in the file of this patent

Z. Physik Chem., A 160 (1932), pages 161–93, article by Walden et al.